(No Model.)
G. HUBERT.
WHIFFLETREE AND HOLDBACK ATTACHMENT.
No. 282,325. Patented July 31, 1883.
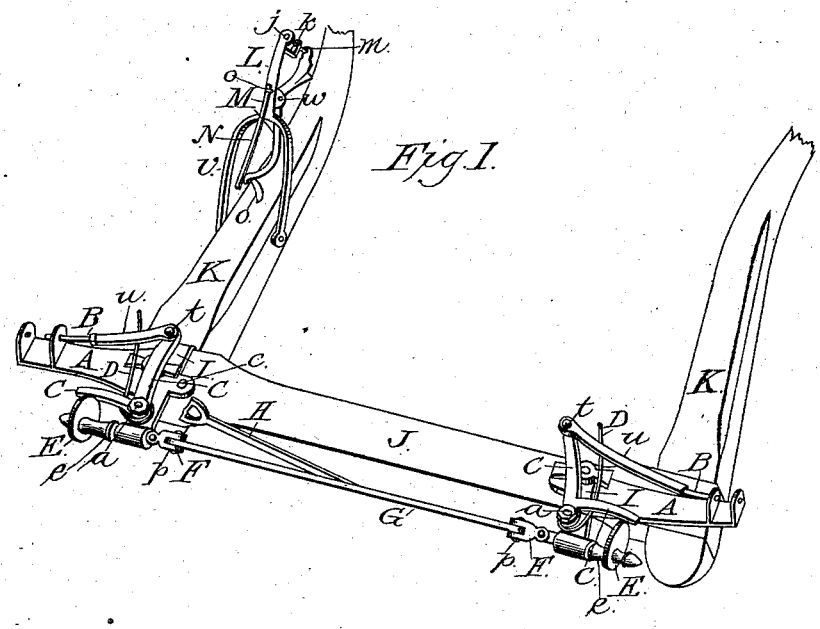
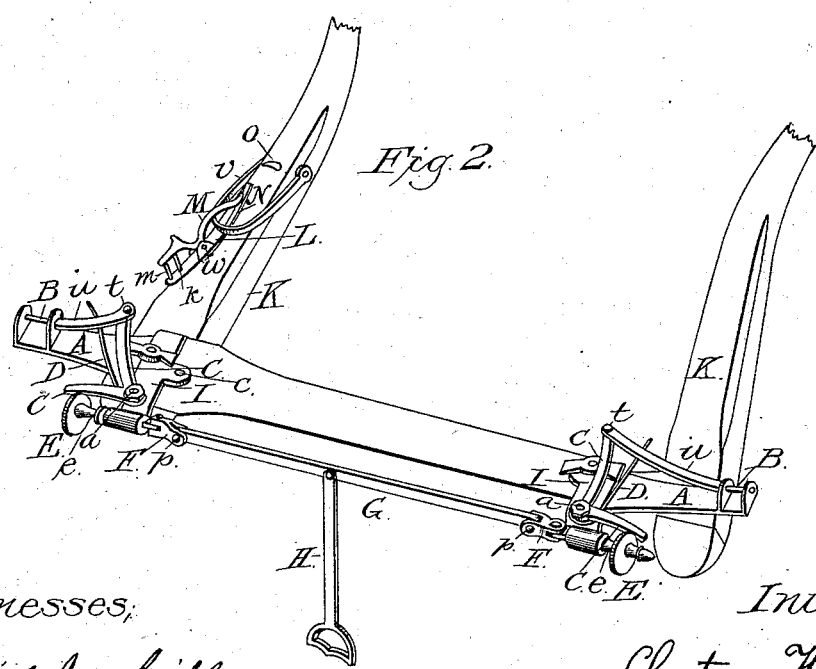
Witnesses:
Ethiel J. Cilley
Tilly Fisher
Inventor:
per Gustav Hubert
Ethiel J. Cilley
Attorney

UNITED STATES PATENT OFFICE.

GUSTAV HUBERT, OF GRAND HAVEN, MICHIGAN.

WHIFFLETREE AND HOLDBACK ATTACHMENT.

SPECIFICATION forming part of Letters Patent No. 282,325, dated July 31, 1883.

Application filed March 31, 1883. (No model.)

*To all whom it may concern:*

Be it known that I, GUSTAV HUBERT, a citizen of the United States, residing at Grand Haven, in the county of Ottawa and State of Michigan, have invented new and useful Whiffletree and Holdback Attachments for Use upon Buggies and other Vehicles, of which the following is a specification.

My invention relates to improvements in whiffletree and holdback attachments in use upon buggies, cutters, and other vehicles drawn by one horse or other animal between shafts, and commonly known as "single" buggies or other vehicles.

The object of my improvements are, first, to provide a whiffletree that will readily adjust itself to the motion of the horse while traveling; second, to avoid the necessity of exercising the entire draft of the horse upon the center of the cross-bar, thus obviating the danger of accident by the breaking of the cross-bar or whiffletree in the center; third, to provide a whiffletree and holdback attachment that cannot by any possible accident be detached from the harness without the direct effort of the operator; fourth, to provide a whiffletree and holdback attachment that can be unclasped and the vehicle detached from the horse at any time, at the will of the operator, while seated in the vehicle; fifth, to provide a holdback attachment that will at all times and without fail become detached from the harness immediately upon the detaching of the traces from the draft-bar of the whiffletree; sixth, to provide a holdback attachment that cannot by any possible accident become detached from the harness until the traces are detached from the whiffletree. I attain these objects by the mechanism illustrated in the accompanying drawings, in which—

Figure 1 is a plan view in which the whiffletree is represented as open and the holdback attachment is thrown over and open for the purpose of detaching the horse from the vehicle in the manner hereinafter described. Fig. 2 is a similar view with the parts in position as when the horse is attached.

Similar letters refer to similar parts throughout the several drawings.

Only one holdback is shown; but it is to be understood that there will be a holdback on each of the shafts.

The draft-bar A, the draft-pin B, the lever C, the spring D, the eccentric E, the link F, the equalizing-bar G, the lever H, and the clip I constitute the frame-work of the whiffletree, and the base L, the lever M, the spring N, and the bracket O constitute the frame-work of the holdback.

The draft-bar A is constructed with two standards, $b\ b$, at the outer or draft end, with a hole through each at $h$, running parallel with the draft-bar A, for the reception of the draft-pin B. The draft-bar extends from draft end or standards $b\ b$ to clip I, and is attached to the clip I by means of a bearing or shaft, $c'$, upon clip I passing through a vertical hole, $c$, in draft-bar A, and held in place by means of a nut or other device, in such a manner that the draft-bar A is allowed to turn freely upon said shaft or bearing $c'$ on clip I, thence at a right angle to A, where it is attached to the eccentric E by means of the shaft or bearing $f$ of eccentric E passing through a horizontal hole $e$ in arm $a$ of draft-bar A, and forming a bearing in which the shaft $e$ of eccentric E turns freely.

The eccentrics E E are attached to the links F F in such a manner as to form a flexible joint at $p\ p$.

The links F F are attached to the equalizing-bar G at $q\ q$ in such a manner as to form flexible joints $q\ q$, turning or bending at right angles with flexible joints $p\ p$ between links F F and eccentrics E E.

It will be seen that by this mechanism the two draft-bars A A are directly connected in such a manner that any motion of the horse in traveling exercised upon one draft-bar A is directly transmitted to the opposite draft-bar A in a reverse direction, thus giving to the draft-bars A and A a motion exactly similar to the motion of an ordinary straight center-draft whiffletree.

The draft-pin B is so constructed that one end will pass through the holes $b\ b$ in standards upon draft-bar A, where it is held in place by means of the springs D, attached to draft-pin B at $u$. The draft-pin extends from $b\ b$ to the end of the lever C at $t$, where they form a flexible joint.

The lever C is attached to a standard upon the arm $a$ of draft-bar A at $d$ by means of the standard $d$ passing through a hole in lever C, and is held in place by means of a nut or other device in such a manner that it can be easily turned to the right or left in a horizontal direction. One end of the lever C is attached to the draft-pin B at $t$ in the manner set forth above, while the opposite end of the lever C, turning at right angles at $d$, is brought in contact with the edge of the eccentric E, and held in place by means of the spring D, bearing upon the draft-pin B at $u$.

The lever H is attached to the equalizing-bar G at $h$, and to the end of the lever opposite the equalizing-bar is attached a cord or wire, $r$, or other device, which extends upward and is secured within convenient reach of the operator.

This whiffletree is so constructed that it may be used upon either a single or a double vehicle, or, in other words, upon a vehicle drawn by either one or two horses.

The entire whiffletree as above described is attached to the cross-bar of a single vehicle by fastening the clip I firmly to the cross-bar J at I by means of bolts, nuts, &c. The clip I is so formed that one arm will extend on each side of the cross-bar or evener in such a manner that a bolt or bolts may pass entirely through both arms of clip I and through cross-bar J, as represented by Fig. 1.

When this whiffletree is attached to a double or two-horse vehicle, the evener, as used with the ordinary whiffletrees, is made of sufficient length to receive one complete whiffletree attachment, as above set forth, upon either side of the tongue of the vehicle.

In my holdback attachment the base L is constructed of iron or other material, with the body L and two arms, $v\ v$, so constructed that when attached to the shaft one arm will be on each side of the shaft K, as represented by L $v\ v$, Fig. 1, and is attached to the shaft K by means of a bolt or other device passing through both arms $v\ v$ and the shaft K at $v\ v$ in such a manner that it may be turned back in the manner represented in Fig. 2. The end of the base L is constructed with a hole, $j$, for the reception of the draft-pin $m$ on lever M, and also with a standard, $k$, for the purpose of holding the holdback-strap from following the draft-pin $m$ on lever M when being raised or drawn for the purpose of detaching the horse from the buggy.

The lever M is constructed with a draft-pin, $m$, a stale or bite, $n$, a fulcrum, $w$, and a body, M. The draft-pin $m$ is attached to a portion of the lever M, and passes from head of lever at $m$ over the standard $k$, upon the base L, and into the hole $j$ in base, for the purpose of clasping and holding the holdback-strap. The body M of the lever is attached to the base L at $w$ by means of a standard or projection upon the base L and a corresponding projection upon the lever M, through which a pin or bolt is passed for the purpose of holding base L and lever M together, and for the purpose of forming a fulcrum upon which the lever M may be worked for the purpose of raising or closing the draft-pin trap $m\ j$.

The lever M is held in position by means of a spring, N, which is attached to the base L at $o$ by means of a rivet, bolt, or other device, and presses upward upon the lever M at N.

The bracket O is attached to the shaft K at $o$ by means of bolts or other device, in such a position that when the base L is raised the end of the lever M at $n$ will press against the bracket O, thus causing the pin $m$ to be drawn, opening the trap $m\ j$, and allowing the holdback-strap to drop out, thus detaching the horse from the buggy.

This whiffletree and holdback attachment may be opened or unclasped, either by means of the cord and lever H, with the operator in the vehicle, or they may be unclasped by hand, in the ordinary way, at the will of the operator.

I am aware that prior to my invention whiffletrees and holdback attachments have been made with adjustable joints, &c. I therefore do not claim such combination, broadly; but What I do claim as my invention, and desire to secure by Letters Patent, is—

1. The combination, in whiffletree and holdback attachments, of the draft-bar A, the draft-pin B, the lever C, spring D, eccentric E, link F, equalizing-bar G, and lever H, attached by clip I to shaft K in whiffletrees.

2. The combination of the base L, lever M, spring N, and bracket O in holdback attachments, substantially as set forth above, and for the purposes specified.

GUSTAV HUBERT.

Witnesses:
CHAS. T. PAGELSON,
DON H. KEDZIE.